United States Patent [19]  
Lindner et al.

[11] Patent Number: 4,666,980  
[45] Date of Patent: May 19, 1987

[54] TRANSPARENT MOULDING COMPOSITIONS

[75] Inventors: Christian Lindner, Cologne; Karl-Heinz Ott; Walter Uerdingen, both of Leverkusen; Hans-Eberhard Braese, Cologne; Hans-Jürgen Kress, Krefeld, all of Fed. Rep. of Germany

[73] Assignee: Bayer Aktiengesellschaft, Leverkusen, Fed. Rep. of Germany

[21] Appl. No.: 748,864

[22] Filed: Jun. 26, 1985

[30] Foreign Application Priority Data

Jul. 6, 1984 [DE] Fed. Rep. of Germany ....... 3424894

[51] Int. Cl.$^4$ .................... C08F 265/06; C08F 279/02
[52] U.S. Cl. ........................................ 525/83; 525/85; 525/310
[58] Field of Search ........................ 525/310, 83, 85

[56] References Cited

U.S. PATENT DOCUMENTS 3,463,833 8/1969 Isogawa ............................. 260/376
3,641,209 2/1972 Ott et al. ............................ 525/310
4,097,555 6/1978 Moran ................................. 525/310
4,490,507 12/1984 Abe et al. ........................... 525/310
4,495,324 1/1985 Chacks et al. ..................... 525/310

FOREIGN PATENT DOCUMENTS 2613121 10/1977 Fed. Rep. of Germany .

Primary Examiner—Wilbert J. Briggs, Sr.  
Attorney, Agent, or Firm—Connolly & Hutz

[57] ABSTRACT

This invention provides thermoplastic moulding moulding compositions with good dimensional stability under heat and transparency consisting of particular graft polymers and optionally thermoplastic polymer resins.

2 Claims, No Drawings

TRANSPARENT MOULDING COMPOSITIONS

Moulding compositions comprising polyvinyl chloride as the main constituent and a mixture of a thermoplastic resin comprising from 30 to 40 parts by weight of α-methylstyrene, from 52 to 62 parts by weight of methylmethacrylate and 4 to 14 parts by weight of acrylonitrile and a graft polymer consisting of from 40 to 60 parts by weight of a monomer mixture of styrene (from 40 to 60 parts by weight), acrylonitrile (from 0 to 10 parts by weight) and methylmethacrylate (40 to 50 parts by weight) on from 40 to 60 parts by weight of polybutadiene or butadiene/styrene copolymer as a modifier, are known from DE-OS 26 13 121.

This invention provides new transparent moulding compositions which simultaneously have good dimensional stability under heat and transparency, comprising A. from 100 to 10% by weight (based on the moulding composition) of a graft product comprising from 95 to 15% by weight (based on the graft product) of a mixture of from 30 to 40 parts by weight of α-methylstryene, from 52 to 62 parts by weight of methylmethacrylate and from 4 to 14 parts by weight of acrylonitrile on from 5 to 85% by weight (based on graft product) of a rubber having a particle diameter ($d_{50}$) of from 50 to 1000 nm comprising from 0 to 40% by weight of polymerised styrene or acrylonitrile and from 100 to 60% by weight of butadiene or $C_1$–$C_6$-alkylacrylate and B. from 0 to 90% by weight (based on the moulding composition) of a thermoplastic polymer resin comprising of from 30 to 40 parts by weight of α-methylstyrene, from 52 to 62 parts by weight of methylmethacrylate and from 4 to 14 parts by weight of acrylonitrile.

These moulding compositions can be used on their own. They are also suitable as additives to polyvinyl chloride to improve the dimensional stability thereof.

The moulding composition according to the invention can consist of the graft product on its own, but thermoplast resin can also be admixed thereto. Mixtures of from 20 to 80% by weight of graft product and from 80 to 20% by weight of thermoplast resin are preferably used. If the moulding compositions according to the invention are used as modifiers, the quantity thereof is generally from 10 to 50% by weight, based on the polyvinyl chloride to be modified.

The graft products are generally emulsion graft products comprising butadiene rubbers or alkylacrylate rubbers as graft base. These graft bases are highly cross-linked and particulate. They all have gel contents of >60% by weight, preferably >75% by weight, and are also generally produced by emulsion polymerisation. The rubber particles have an average particle diameter ($d_{50}$) of from 5 to 1000 nm, preferably from 80 to 200 nm, and particularly from 80 to 150 nm. They provide polymers of butadiene or alkylacrylates, but particularly copolymers with styrene or acrylonitrile. They generally have glass transition temperatures of <10° C. In this context, alkylacrylates are esters of acrylic acid with aliphatic alcohols having from 1 to 8 carbon atoms, such as butylacrylate, hexylacrylate, ethylhexylacrylate and ethylacrylate. These rubbers can also contain copolymerised minor quantities of cross-linking polyfunctional monomers such as triallylcyanurate, allylacrylate, alkylene diol dimethacrylate, polyether diol dimethacrylate or divinyl benzene. Rubbers which are particularly suitable have a core/sheath structure. Rubbers which are particularly preferred comprise from 28 to 40% by weight of styrene or acrylonitrile, from 72 to 60% by weight of butadiene or $C_1$–$C_6$-alkylacrylate, have gel contents of greater than 85% by weight and average particle diameters ($d_{50}$) of from 80 to 150 nm.

A mixture of from 30 to 40 parts by weight, particularly from 32 to 37 parts by weight, of α-methylstyrene, from 52 to 62 parts by weight, particularly from 53 to 58 parts by weight, of methylmethacrylate and from 4 to 14 parts by weight, particularly from 8 to 12 parts by weight, of acrylonitrile are polymerised onto these rubbers. The graft products can be produced in a known manner by radical polymerisation of an emulsion of the monomers in the presence of rubber latches. Free resin is produced in addition to the actual graft polymer during this graft polymerisation. Graft product designates the material produced during graft polymerisation. In most cases this is a mixture of actual graft polymer and free resin which is initially produced.

Polymer resins in the context of the present invention are terpolymers obtained in a known manner by emulsion polymerisation, comprising from 30 to 40, particularly from 32 to 37 parts by weight of α-methylstyrene, from 52 to 62, particularly from 53 to 58 parts by weight of methylmethacrylate and from 4 to 14, particularly from 8 to 12, parts by weight of acrylonitrile. Without exception they have Staudinger indices, measured in dimethyl formamide at 20° C. of >0.3, particularly of from 0.35 to 0.8 dl/g.

The graft polymers and the polymer resins can be produced by alkaline, radical-initiated emulsion polymerisation at a pH of >8, particularly from 8.5 to 12. Water-soluble inorganic peroxy compounds, such as alkali (potassium or sodium) peroxy disulphate, or alkali (potassium or sodium) peroxy diphosphate can be used as initiators. The use of reducing agents has not proved favourable as products obtained in this manner have poor tenacity and thermostability. Alkali (sodium or potassium) salts of organic carboxylic acids can preferably be used as emulsifiers for emulsion polymerisation. Sulphonates as emulsifiers are generally less favourable. Salts of resin acids, oleic acid and stearic acid are particularly preferred emulsifiers. Graft polymerisation in the presence of inorganic initiators and regulating mercaptans, such as dodecyl mercaptan, is particularly preferred. The graft products and the polymer resins are generally obtained in the form of latices which in most cases have a solids content of from 20 to 60% by weight. If mixtures of graft products and polymer resins are to be produced, the latices can be mixed and jointly coagulated in a conventional manner by means of, for example, inorganic or organic acids, such as acetic acid, formic acid, hydrochloric acid, sulphuric acid, phosphoric acid or with water-soluble inorganic or organic salts, such as sodium chloride, magnesium sulphate, calcium sulphate, aluminium sulphate, calcium formate or sodium acetate. The coagulated solids can be isolated and dried in a known manner. Additives, such as stabilizers, lubricants, pigments and antistatic agents, conventionally used with thermoplastic moulding compositions, can be added prior to or subsequent to processing.

EXAMPLES

1. Polymers used (types of resin)

1.1 PVC composition—polymer (Vestolit M6867 by Chem. Werke Hüls), K-values of the PVC=68

1.2 Terpolymer resins within the context of the invention comprise 34.5% by weight of α-methylstyrene, 55.5% by weight of methylmethacrylate and 10% by weight of acrylonitrile having a Staudinger index [μ] (measured in DMF at 20° C.) of 0.4 dl/g:

The following are placed in a reactor at 80° C. under stirring:
3360 parts by weight of water
10 parts by weight of Na-salt of disproportionated abietic acid
6 parts by weight of 1n-sodium hydroxide solution
The following monomer mixture is then added:
69 parts by weight of α-methylstyrene
111 parts by weight of methylmethacrylate
20 parts by weight of acrylonitrile
0.7 parts by weight of tert.-dodecyl mercaptan.

Polymerisation is initiated by addition of 9 parts by weight of potassium peroxy disulphate, dissolved in 300 parts by weight of water.

The following solutions are then simultaneously fed into the reactor over a period of 6 hours at 75° C.:
Solution 1:
1765 parts by weight of water
60 parts by weight of Na-salt of disproportionated abietic acid
36 parts by weight of 1n-sodium hydroxide solution
Solution 2:
900 parts by weight of α-methylstyrene
1443 parts by weight of methylmethacrylate
200 parts by weight of acrylonitrile
7.2 parts by weight of tert.-dodecyl mercaptan The mixture is then polymerized to completion at 80° C. over a period of 4 hours. The resulting latex has a polymer solids content of 33% by weight and a pH of 10. After stabilization with phenolic antioxidants, the latex is coagulated with a mixture of magnesium sulphate and acetic acid at a pH of from 4 to 5 and at a temperature of from 90° to 100° C. and is then dried to produce a resin powder.

1.3 Copolymer resin (comparison) comprising 31% by weight of acrylonitrile and 69% by weight of α-methylstyrene and with a Staudinger index [μ] (measured in DMF at 20° C.) of 0.43 dl/g, produced by emulsion polymerisation.

2. Graft polymers (a) used in the context of the invention:

An SBR rubber latex containing a copolymer, 35% by weight of styrene and 65% by weight of butadiene is used as graft base. The latex has a polymer solids content of 32.4% by weight, an average latex particle size ($d_{50}$) of 120 nm; the copolymer has a gel content of 88% by weight. The latex is produced by radical emulsion polymerisation at 60° C. with potassium peroxy disulphate as initiator and Na-salt of disproportionated abietic acid at a pH of from 11 to 12.

Graft polymers are produced according to the following Table.

TABLE 1

| Product | 2.1 | 2.2 | 2.3 | 2.4 | 2.5 |
|---|---|---|---|---|---|
| Sol. 1: | | | | | |
| SBR-latex | 862 | 1723 | 1723 | 3125 | 4375 |
| water | 2000 | 1140 | 1140 | 1255 | 200 |
| Sol. 2: | | | | | |
| potassium peroxy disulphate | 10 | 10 | 10 | 4 | 4 |
| water | 300 | 300 | 300 | 100 | 100 |
| Sol. 3: | | | | | |

TABLE 1-continued

| Product | 2.1 | 2.2 | 2.3 | 2.4 | 2.5 |
|---|---|---|---|---|---|
| α-methylstyrene | 869 | 113 | 773 | 345 | 276 |
| methylmethacrylate | 1399 | 1243 | 1243 | 555 | 444 |
| acrylonitrile | 252 | 224 | 224 | 100 | 80 |
| tert.-dodecylmercaptan | — | — | 3 | — | — |
| Sol. 4: | | | | | |
| water | 3000 | 3000 | 3000 | 1000 | 1000 |
| Na—salt of disproportionated abiectic acid | 50 | 45 | 45 | 36 | 20 |
| 1n-sodium hydroxide solution | 42 | 40 | 40 | 30 | 12 |

Values are in parts by weight

Solution 1 is placed in a reactor; solutions 3 and 4 are then metered in within a period of 5 hours after heating to 75° C. and initiating with solution 2. The mixture is subsequently polymerised for 4 hours at 75° C. After cooling to 20° C., the latices are stabilized with 1.2% by weight of phenolic antioxidants, based on 100 parts of graft polymer. The graft polymer, 2.1 to 2.5 respectively, is isolated from the latex using a mixture of acetic acid and Mg-sulphate, thoroughly washed and dried to form a powder.

The graft polymers contain different quantities of rubber:
Product 2.1 contains 10% by weight of rubber (SBR)
Product 2.2 contains 20% by weight of rubber (SBR)
Product 2.3 contains 20% by weight of rubber (SBR)
Product 2.4 contains 50% by weight of rubber (SBR)
Product 2.5 contains 70% by weight of rubber (SBR)

3. Comparative graft polymers 3.1 ABS polymer powder comprising 50% by weight of cross-linked polybutadiene (having an average particle size of 400 nm) and 50% by weight of SAN a composition of: 72 parts of styrene and 28 parts of acrylonitrile.

3.2 ABS polymer powder comprising 70% by weight of butadiene according to 3.1 and 30% by weight of SAN with a composition analogous to 3.1.

3.3 Polymer powder comprising 13% by weight of ABS of type 3.1 and 87% by weight of a copolymer resin comprising 69% by weight of α-methylstyrene and 31% by weight of acrylonitrile having a Staudinger latex [μ] (measured in DMF at 20° C.) of 0.55 dl/g.

3.4 Polymer comprising 23% by weight of ABS of type 3.1 and 77% by weight of copolymer resin of type 1.3.

3.5 Graft polymer powder containing, as rubber base, a copolymer comprising 70% by weight of butadiene, 20% by weight of styrene and 10% by weight of acrylonitrile. The average particle diameter ($d_{50}$) is 80 nm, and it comprises 70 parts by weight of this rubber and 30 parts by weight of a resin component comprising of 52% by weight of styrene and 48% by weight of methyl methacrylate.

The polymers 3.1 to 3.5 are known. They are produced by emulsion graft polymerisation.

4. The production of thermoplast mouldings from the powders (or mixtures thereof) 1 to 3

The powders are compounded in the above mixing ratios using conventional lubricants (0.2 parts of Loxiol G 70) and optionally PVC-stabilizer (1.5 parts of Irgastab 17 M) on a cylinder at 185° C. (over a period of 10 min). Test mouldings and plates (with a thickness of 4 mm) are then produced from the compound by pressing at a temperature of 190° C. within a period of 10 min.

5. Comparison of properties

TABLE 4

|  | 5.2.8 | 5.2.9 | 5.2.10 | 5.2.11 | 5.2.12 | 5.2.13 | 5.2.14 | 5.2.15 |
|---|---|---|---|---|---|---|---|---|
| Compound | 1.1 (60) | 1.1 (60) | 1.1 (60) | 1.1 (60) | 1.1 (60) | 1.1 (60) | 1.1 (60) | 1.1 (60) |
| Values in parts by weight. | 2.1 (40) | 2.2 (40) | 2.3 (40) | 3.3 (40) | 3.4 (40) | 1.2 (28.6) 3.5 (11.4) | 1.2 (28.6) 2.5 (11.4) | 1.3 (28.6) 2.5 (11.4) |
| Indentation hardness (MPa 30″) | 116 | 110 | 110 | 116 | 109 | 115 | 115 | 115 |
| Impact strength (kJ/m$^2$) | u.b. | u.b. | u.b. | 90 | u.b. | u.b. | u.b. | u.b. |
| Notched impact strength (kJ/m$^2$) | 3 | 6 | 7 | 2.8 | 4.5 | 6 | 8 | 8 |
| Dimensional stability under heat Vicat B (°C.) | 94 | 94 | 94 | 92 | 89 | 90 | 94 | 93 |
| Cloudiness (%) | 12 | 10 | 11 | — | — | 12 | 11 | 70 |
| Degree of light transmission (%) | 66 | 69 | 69 | 30 | 23 | 68 | 67 | 23 | ub = unbroken

5.1

TABLE 2a

| Compound (in each case 100 parts) | 2.1 | 2.2 | 2.3 | 3.3 |
|---|---|---|---|---|
| Indentation hardness (M Pa 30″) | 125 | 98 | 95 | 94 |
| Impact strength (kJ/m$^2$) | 21 | 52 | 65 | 60 |
| Notched impact strength (kJ/m$^2$) | 3 | 7.5 | 8.5 | 8.5 |
| Dimensional stability Vicat B (°C.) | 115 | 110 | 110 | 105 |
| Cloudiness (%) | 11 | 9 | 11 | 96 |

As can be seen from Table 2a, the graft polymers according to the invention are distinguished by good mechanical properties; the mouldings compositions 2.1, 2.2 and 2.3 are also highly-transparent in comparison with a standard material 3.3. It can also be seen that 2.3 has an improved level of mechanical strength, surprisingly based on grafting the monomers in the presence of a mercaptan.

TABLE 2b

|  | 1 | 2 | 3 | 4 |
|---|---|---|---|---|
| Compound comprising (parts by weight) | 40 parts of 2.4 60 parts of 1.2 | 40 parts of 2.4 60 parts of 1.3 | 40 parts of 3.1 60 parts of 1.2 | 40 parts of 3.1 60 parts of 1.3 |
| Impact strength (kJ/m$^2$) | 95 | 78 | 83 | 89 |
| Notched impact strength (kJ/m$^2$) | 13 | 12 | 11 | 12 |
| Dimensional stability Vicat B (°C.) | 103 | 99 | 98 | 98 |
| Cloudiness (%) | 11 | 92 | 97 | 98 |

As can be seen from Table 2b, the resin/graft product mixtures 1 according to the invention are distinguished by particularly good mechanical properties and good transparency, although this was not to be expected from mixtures 2 to 4 (comparative compounds).

5.2 PVC-containing moulding compositions

The following Tables show the particular suitability of the compositions or graft products according to the invention as components in PVC-moulding compositions.

TABLE 3

|  | 5.2.1 | 5.2.2 | 5.2.3 | 5.2.4 | 5.2.5 | 5.2.6 | 5.2.7 |
|---|---|---|---|---|---|---|---|
| Compound | 1.1 (100) | 1.1 (90) | 1.1 (90) | 1.1 (92.5) | 1.1 (87.5) | 1.1 (92.5) | 1.1 (87.5) |
| Values in parts by weight |  | 2.4 (10) | 3.1 (10) | 2.5 (7.5) | 2.5 (12.5) | 3.2 (7.5) | 3.2 (12.5) |
| Indentation hardness (MPa 30″) | 121 | 108 | 105 | 139 | 96 | 94 | 85 |
| Impact strength (kJ/m$^2$) | — | — | — | — | — | — | — |
| Notched impact strength (kJ/m$^2$) | 2 | 5.5 | 6.0 | 5.5 | 35 | 10 | 40 |
| Dimensional stability Vicat B (°C.) | 83 | 83 | 81 | 83 | 82 | 80 | 79 |
| Cloudiness (%) | 11 | 10 | 64 | 9 | 9 | 96 | 98 |

The moulding compositions according to the invention 5.2.2, 5.3.4, 5.2.5 have improved hardness/dimensional stability under heat reactions at reasonable toughness values which are relevant in practice in addition to very high optical transparency in comparison with known compounds.

In addition to the mouldings having exceptional transparency, the compositions according to the invention 5.2.8 to 5.2.10 have greater dimensional stability under heat (in spite of higher rubber contents), improved tenacity and greater hardness. The comparison 5.2.13 with 5.2.14 also shows that the use of conventional graft rubbers 3.5 also produces transparent moulding compositions but that the mechanical properties of the moulding composition according to the invention is nevertheless better. The use of the known resin 1.3 also forms moulding compositions with good dimensional stability under heat but the mouldings are opaque.

APPENDIX TO THE MEASURING METHOD USED IN THE TEXT $d_{50}$-values are average particle diameters, determined by ultracentrifuge measurements, c.f. W. Scholtan et al. Colloids Z. Polymere 250 (1972), p. 783–796.

For the definition of the Staudinger index, c.f. "Polymeranalytik I and II", M. Hoffmann et al. Georg-Thieme-Verlag, Stuttgart, 1977.

Indentation hardness, determined according to DIN 53456

Impact strength, determined according to DIN 53453

Notched impact strength, determined according to DIN 53453

Dimensional stability under heat, determined according to DIN 53460

Cloudiness, determined according to DIN 5036

Degree of light transmission, determined according to DIN 5036.

We claim:

1. Transparent thermoplastic moulding compositions comprising
   A. from 100 to 10% by weight (based on the moulding composition) of a graft product of from 95 to 15% by weight (based on the graft product) of a mixture of from 30 to 40 parts by weight of α-methylstyrene, from 52 to 62 parts by weight of methylmethacrylate and from 4 to 14 parts by weight of acrylonitrile on from 5 to 85% by weight (based on the graft product) of a rubber having a particle diameter ($d_{50}$) of from 50 to 1000 nm comprising from 0 to 40% by weight of polymerised styrene or acrylonitrile and from 100 to 60% by weight of polymerized butadiene or $C_1-C_6$ alkylacrylate and
   B. from 0 to 90% by weight (based on the moulding composition) of a thermoplastic polymer resin comprising from 30 to 40% by weight of α-methylstyrene, from 52 to 62 parts by weight of methylmethacrylate and from 4 to 14 parts by weight of acrylonitrile.

2. Moulding compositions according to claim 1, in which compositions the graft product A is based on a rubber comprising of from 28 to 40% by weight of polymerized styrene or acrylonitrile and from 72 to 60% by weight of polymerised butadiene or $C_1-C_6$ alkylacrylate.

* * * * *